Mar. 27, 1923.
C. MERLI ET AL.
MEAT PACKING MACHINE.
ORIGINAL FILED FEB. 8, 1921.
1,450,104.
3 SHEETS—SHEET 1.
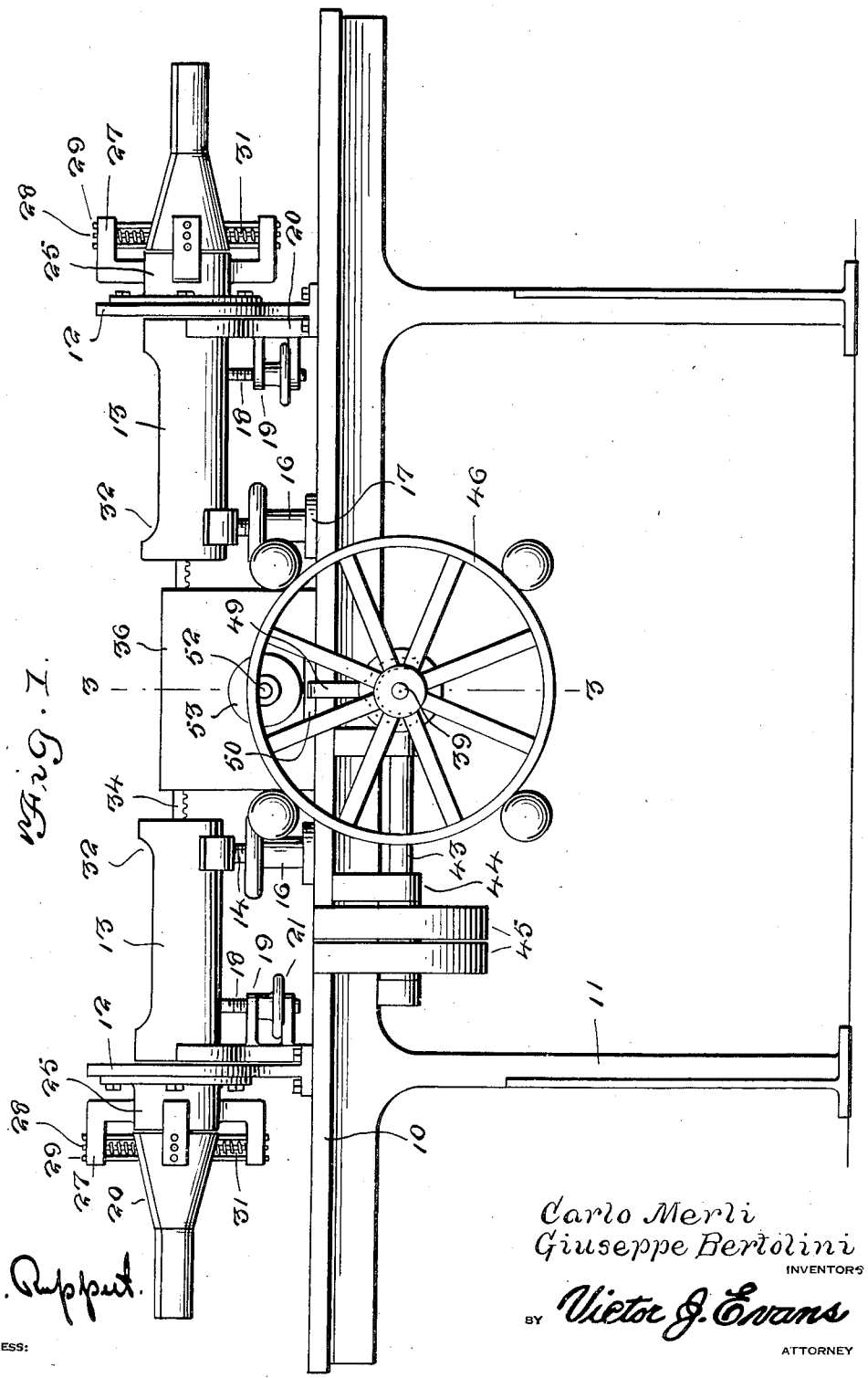

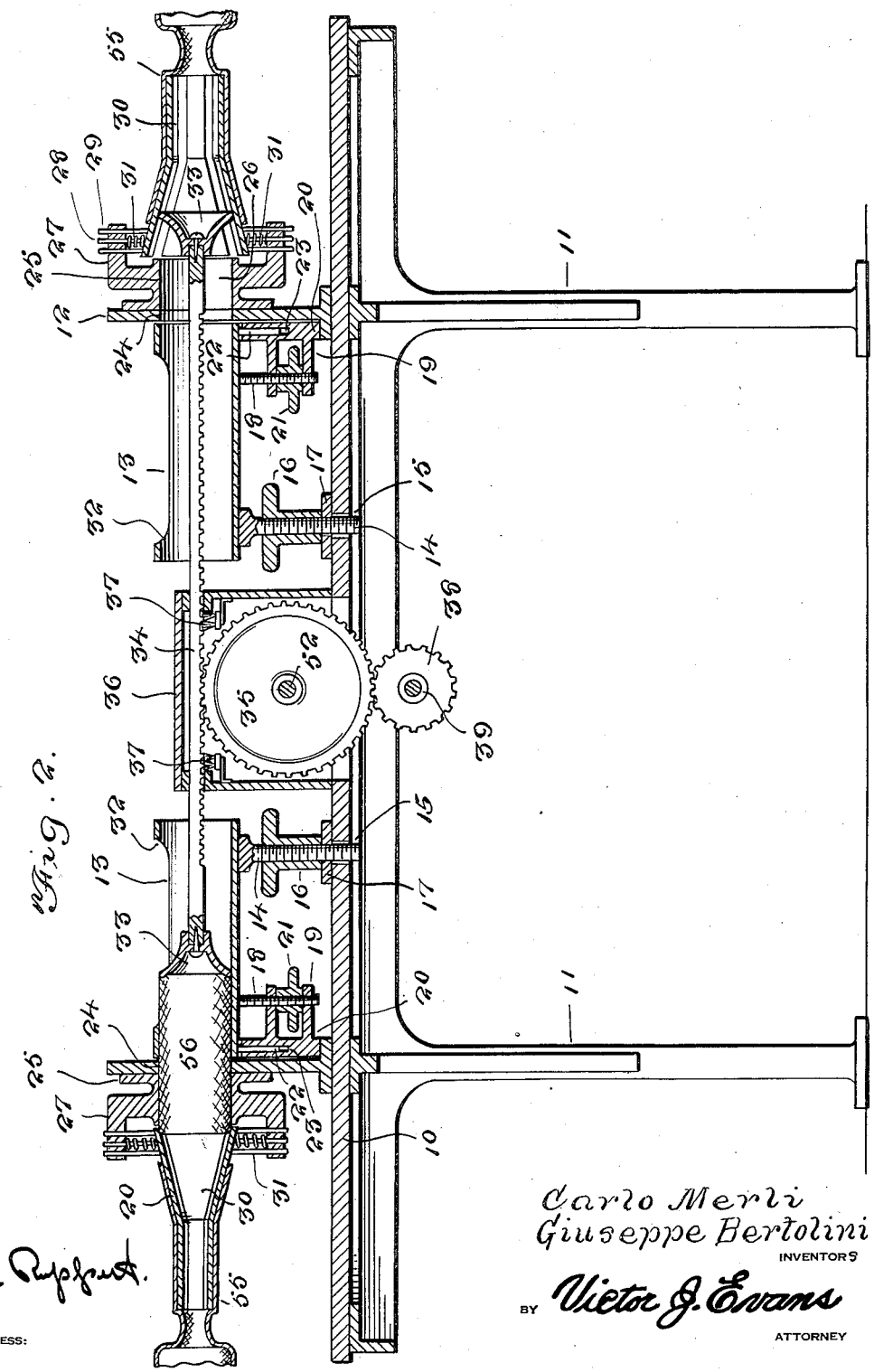

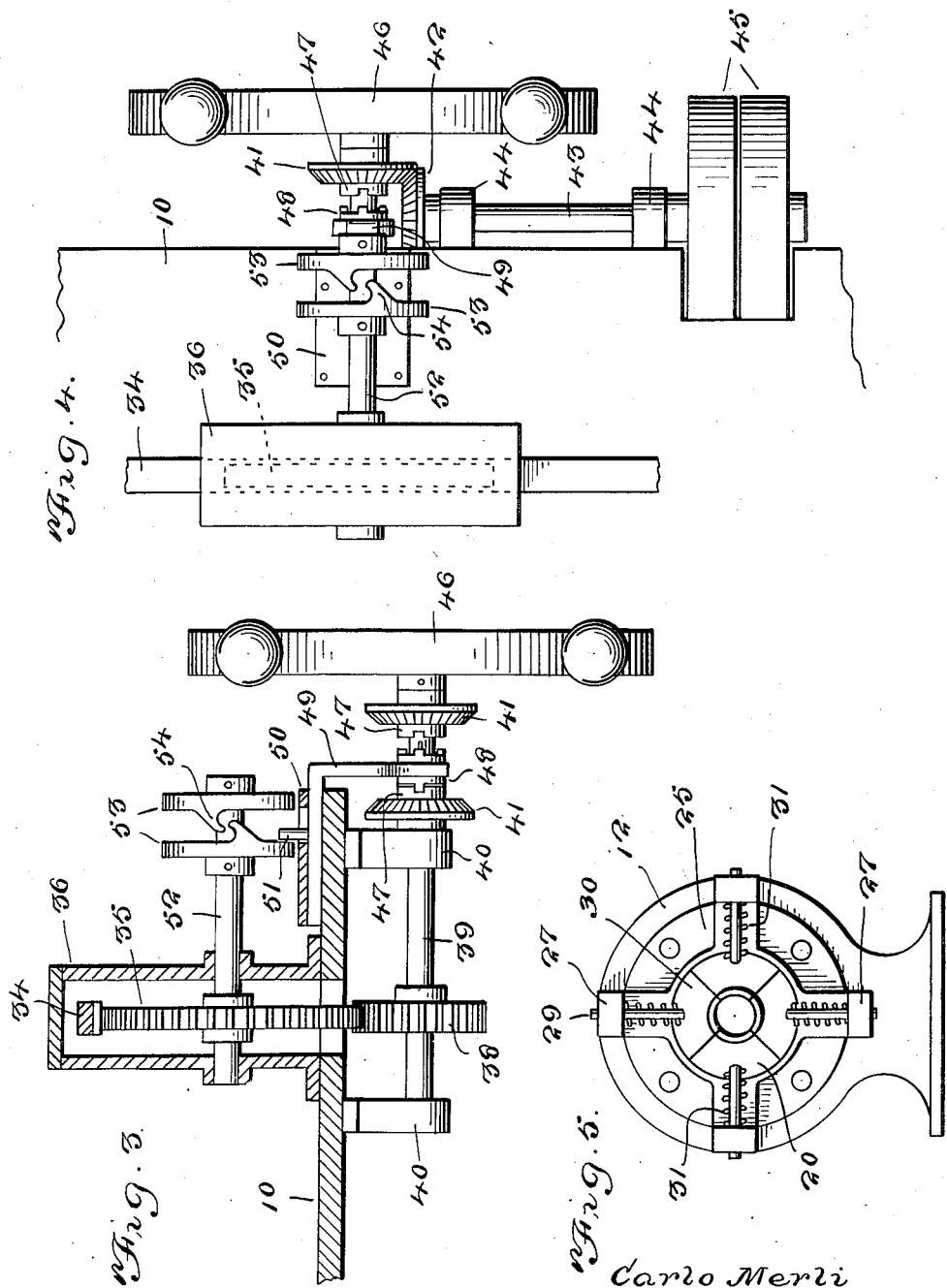

Patented Mar. 27, 1923.

1,450,104

UNITED STATES PATENT OFFICE.

CARLO MERLI AND GIUSEPPE BERTOLINI, OF NEW YORK, N. Y.; SAID BERTOLINI ASSIGNOR OF HIS RIGHT TO VICTOR KLEINBERG, SALVATORE MANGIAPANE, AND FRANK FUMO, OF NEW YORK, N. Y.

MEAT-PACKING MACHINE.

Application filed February 8, 1921, Serial No. 443,453. Renewed January 5, 1923.

*To all whom it may concern:*

Be it known that we, CARLO MERLI and GIUSEPPE BERTOLINI, citizens of Italy, residing at New York, in the county of New York and State of New York, have invented new and useful Improvements in Meat-Packing Machines, of which the following is a specification.

This invention relates to machines for packing meat, being especially adapted for packing a cut of meat provided by the neck portion of a pig and packed within a skin or casing preparatory to tying the same to provide an appetizing and sanitary product.

Another object of the invention is the provision of a meat packing machine wherein the operation of packing is effected at each stroke of the packing plunger, the machine being so constructed that a solid cut of meat or like provision is forced within this skin or casing, both by the forward and reverse stroke of the packing mechanism.

Another object is the provision of a packing plunger for use in connection with a machine of this character, which acts to prevent particles of the meat product from adhering to the inner walls of the feed hopper and casing holder of the machine, the result being to prevent the formation of maggots or other larva peculiar to meats, and especially peculiar to pork products and thus aid in maintaining the machine in a sanitary condition.

Another object is the provision of a removable hopper for feeding the meat to the casing holder, so as to provide for the substitution of hoppers of different sizes to accommodate different cuts of meat, the hopper being so maintained as to permit of accurate and ready adjustment to insure the proper operation of the machine.

With the above and other objects in view, the invention further includes the following novel features and details of construction, to be hereinafter more fully described, illustrated in the accompanying drawings and pointed out in the appended claims.

In the drawings:—

Figure 1 is an elevation of a meat packing machine constructed in accordance with the invention.

Figure 2 is a central vertical longitudinal sectional view of the same.

Figure 3 is a fragmentary transverse section on the line 3—3 of Figure 1.

Figure 4 is a fragmentary plan view.

Figure 5 is an end view of one of the casing holders.

The machine illustrated in the accompanying drawings is designed to pack cuts of meat as above specified without previously grinding the meat, in other words, the cut is packed within a skin or casing "whole." For this purpose, the machine includes a table 10, which may be supported upon legs or standards 11. Mounted upon the table 10 near each end thereof is a standard 12, while located adjacent each of the standards 12 is a feed hopper 13. These hoppers are preferably cylindrical and are horizontally disposed, being provided at one end with a downwardly extending threaded standard 14, which operates through an opening 15 provided in the table top 10.

Mounted upon the standard 14 is an adjusting nut 16, which bears against a plate 17, resting upon the top of the table. By this means the inner ends of each of the feed hoppers 13 may be vertically adjusted. The hoppers 13 are provided with additional downwardly extending standards 18, which are located adjacent the opposite or outer ends of the hoppers. The standards 18 are also threaded and are movable through openings provided in spaced brackets 19 which extend from members 20 secured to the standards 12. Mounted upon the standards 18 are adjusting nuts 21, which are located between the brackets 19 and by means of which the outer ends of the hoppers 13 are vertically adjustable. A guide pin 22 carried by each of the hoppers 13 operates in a socket 23 provided in each of the members 20.

The hoppers 13 are open at each end, one of said ends being located adjacent an opening 24 provided in each of the standards 12 and being accurately registered with these openings through the adjusting screws 16 and 21 just described. Secured to the standard 12 opposite the hopper 13 is a guide member 25, which is provided with a bore 26 which registers with the opening 24 of the standards 12. Projecting outwardly from the guide member 25 are arms 27, each of these arms being provided with openings for the reception of pins 28 and 29, the former being positioned between the latter. The pins 28 and 29 are secured to separate sections 30 of an expansible casing holder, these sections being of segmental formation and supported by the pins 28 and 29 which operate through the arms 27. The casing holder is normally collapsed through the medium of springs 31 which surround the pins 28 and is expanded against the action of these springs by the passage of the product passing therethrough, as will be hereinafter apparent. The hoppers 13 are provided with feed openings 32. By means of the adjusting nuts 21, the hoppers may be centered relatively to the guide members 25, so that guide members of different diameters may be employed.

Operating within the feed hoppers are plungers 33, the latter being of cup-like formation and of a flexible character, being preferably formed of rubber. In their operation, the edges of these plungers engage the inner walls of the feed hoppers, the guide and the expansible casing holder and prevent particles of meat from adhering to these walls. This acts to prevent the formation of maggots or other larva, which would otherwise quickly form, especially during the packing of pork products in warm weather. In addition the cleaning or washing of the machine is greatly facilitated.

The hoppers 13 are arranged upon the table top 10 in longitudinal alignment and the plungers 33 are connected by a rack bar 34, whose teeth is engaged by a gear 35. The rack bar 34 and the gear 35 operate within a housing 36 and located within this housing at opposite sides of the gear 35 are brushes or wipers 37, whose office is to remove from the teeth of the rack bar 34, oil or other lubricant and thus prevent the latter from reaching the meat. The gear 35 is engaged by a pinion 38, which is mounted upon a shaft 39 and this shaft operates in bearings 40 extending from the bottom of the table 10. Loosely mounted upon the shaft 39 are beveled pinions 41, which are engaged by a pinion 42. This last mentioned pinion is mounted upon one end of a shaft 43 which operates in bearings 44 also carried by the table top, the said shaft 43 having mounted thereon fast and loose pulleys 45, by means of which power may be applied to the machine. It is preferred to equip the shaft 39 with a weighted fly wheel 46.

In order to secure either of the beveled pinions 41 to the shaft 39 so as to rotate said shaft and impart motion to the rack bar 34, each of the beveled pinions 41 is provided with a clutch member 47, these members being adapted to be engaged by a clutch collar 48 which is slidably mounted upon and rotatable with the shaft 39. The clutch collar 48 carries a substantially L-shaped arm 49, which operates in a guide 50 mounted upon the top of the table, the said arm carrying a pin 51 which extends through a slot provided in the guide 50. Secured to the shaft 52 upon which the gear 35 is mounted, are spaced disks 53, each of these disks being provided with an inwardly extending inclined cam projection 54 which is adapted to engage the pin 51 so as to cause the clutch collar 48 to engage one of the clutch members 47 and thus regulate the direction of rotation of the shaft 39.

In the operation of the machine, each of the expansible casing holders is covered by a skin or casing 55 and a cut of meat manually inserted through the feed opening of one of the hoppers 13, for example, the hopper shown to the left of Figure 2, where the meat cut is indicated at 56. The plunger will travel to the left of the said figure and will force the meat cut 56 from the hopper through the guide 25 into the expansible casing holder 30. The holder 30 will thus be expanded and the meat cut forced into that portion of the skin or casing 55 which extends beyond the end of the holder 30, a sufficient portion of the skin or casing extending beyond the holder for this purpose. As soon as the other plunger 33 has reached the limit of its inward stroke, another cut of meat is inserted within the other hopper and the operation repeated, the change of direction of travel of the rack bar 34 which carries the plungers being effected through the operation of the cams 54. After the meat has been forced within the skin or casing, the latter is fed downward over the end to receive the next cut, by the passage of this cut through the outer end of the casing holder, this feeding of the casing being effected by the passage of the meat through the outer end of the casing holder 30. Thus, only the proper amount of the skin or casing is fed from the holder for the accommodation of the particular piece of meat provided.

The invention is susceptible of various changes in its form, proportions and minor details of construction and the right is herein reserved to make such changes as properly fall within the scope of the appended claims.

Having described the invention what is claimed is:—

1. A stuffing machine comprising a base, a feed hopper mounted thereon and open at one end, a guide member having a passage therein communicating with said open end of the feed hopper, a spring actuated radially expansible casing holder carried by the guide member and communicating with said passage, radial guide pins carried by the casing holder and movable in the guide member, a plunger operating within the feed hopper for forcing the contents of the latter through the casing holder and means for operating the plunger.

2. A stuffing machine comprising a base, a removable feed hopper mounted thereon and open at one end, a guide member having a passage therein communicating with said open end of the feed hopper, a casing holder carried by the guide member and communicating with said passage, means for adjusting the removable feed hopper relative to the passage of the guide member for centering the hopper, a plunger operating within the feed hopper for forcing the contents of the latter through the casing holder and means for operating the plunger.

3. A stuffing machine comprising a base, aligned oppositely disposed feed hoppers mounted thereon, casing holders located at the outer opposite ends of the feed hoppers, a plunger operating within each of the feed hoppers for forcing the contents of the latter through the casing holders, a rack bar connecting the plungers, means for operating the rack bar and means operated by the rack bar operating means for changing the direction of travel of said rack bar.

4. A stuffing machine comprising a base, aligned oppositely disposed feed hoppers mounted thereon, casing holders located at the outer opposite ends of the feed hoppers, a plunger operating within each of the feed hoppers for forcing the contents of the latter through the casing holders, a rack bar connecting the plungers, means for operating the rack bar and means operated by the rack bar operating means and including a clutch and a cam operating the clutch for changing the direction of travel of the rack bar.

5. A stuffing machine comprising a base, aligned oppositely disposed feed hoppers mounted thereon, casing holders located at the opposite ends of the feed hoppers, a plunger operating within each of the feed hoppers for forcing the contents of the latter through the casing holders, a rack bar connecting the plungers, means for operating the rack bar, a clutch operatively connected to the rack bar for changing the direction of travel of the latter, a slide connected to the clutch and means for moving the slide to operate the clutch.

In testimony whereof we affix our signatures.

CARLO MERLI.
GIUSEPPE BERTOLINI.